Figure 1:
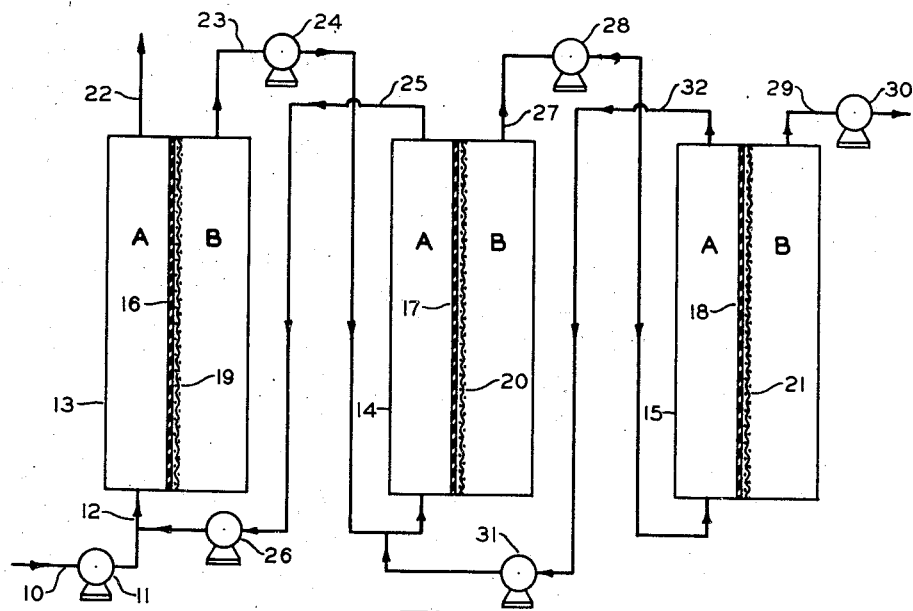

May 23, 1939.　　　　　F. E. FREY　　　　　2,159,434

PROCESS FOR CONCENTRATING HYDROCARBONS

Filed June 27, 1936

INVENTOR.
FREDERICK E. FREY
BY Hudson, Conner, and Young
ATTORNEYS.

Patented May 23, 1939

2,159,434

UNITED STATES PATENT OFFICE 2,159,434

PROCESS FOR CONCENTRATING HYDROCARBONS

Frederick E. Frey, Bartlesville, Okla., assignor to Phillips Petroleum Company, a corporation of Delaware Application June 27, 1936, Serial No. 87,791

14 Claims. (Cl. 196—94)

This invention relates to methods for producing concentrates of desired organic compounds from mixtures of gaseous or readily volatilized organic compounds, and it particularly relates to methods for producing concentrates of certain volatile hydrocarbons.

An object of this invention is to effect a concentration of certain components of a mixture of organic compounds by taking advantage of specificity with respect to their molecular weight and unsaturated character.

Another object is to produce a concentrate of hydrocarbons of higher average molecular weight than the hydrocarbon mixture being treated.

Another object is to produce a concentrate of hydrocarbons of lower average molecular weight than the hydrocarbons being treated.

Another object is to produce a concentrate richer in unsaturated or cyclic compounds than the material being treated.

Further objects will be apparent from the following disclosure.

The objects of this invention are attained by taking advantage of the different rates at which different organic compounds will penetrate and pass through a film or diaphragm such as a thin sheet of rubber, or the like. The objects and practice of this invention depend largely upon the solubility of the organic compound in the diaphragm. Diaphragms suitable for use in my invention are essentially non-porous, in the sense that they contain no microscopic pores such as are found in wood and porous ceramic walls.

It is fully appreciated that the separation of gases by diffusion through a porous diffusion partition has been proposed in U. S. Patent 1,496,757 issued to Lewis, et al., dated June 3, 1924 for "Process of separating gases." The rates at which different gases diffuse through such a porous medium vary inversely with the square root of their density or molecular weight, and while such a method as taught in the Lewis patent might be used conveniently for separating gases having a wide difference in density, such, for example, as hydrogen from carbon dioxide or helium from natural gas, it would be entirely unsuitable for separating gases having approximately the same densities, such as butenes and butanes.

This invention is based upon the discovery that hydrocarbons in the vapor state pass through substances such as rubber and the like at rates depending on the molecular weight, saturation and molecular structure of the hydrocarbon molecule. While the exact mechanism by which hydrocarbon vapors pass through rubber and its equivalents, is not understood, the solubility of the hydrocarbon in rubber appears to be the mechanism whereby the hydrocarbon vapor passes into one face and out of the other face of a rubber body. It has been discovered that among the lower paraffins and olefins the rate of passage through a thin rubber wall increases with molecular weight, and the diffusion rate for a given olefin is more rapid than for a paraffin of about the same boiling point.

While it is not desired to limit this invention by any single theory, it is believed that the mechanism of the method is as follows:

The organic compound, such as hydrocarbon, dissolves in the rubber on the side at which the higher partial pressure of its vapor exists, the dissolved molecules diffuse through the rubber by non-capillary diffusion and pass to the opposite side, and pass from solution into the vapor phase where the lower partial pressure of its vapor exists. For given compounds, the rate of passage through the rubber or other membrane will depend primarily on the solubility of the compound in the rubber membrane and the rate of diffusion of dissolved molecules through the membrane. The function will continue as long as a difference of partial pressure of the compound exists between the gas mixtures on the two sides of the membrane. The method is favored and accelerated by removing the gas leaving the membrane by pumping off or sweeping away by a stream of air or other gas substantially insoluble in rubber. Increasing the total pressure on the diffusing gas mixture will increase the overall rate of diffusion of gas through the membrane but may decrease the selectivity. In this invention an absolute pressure differential between the two sides does not result in "mass motion" as it does in the case of diffusion through a porous partition.

It has long been known that hydrocarbons in the vapor state will pass through rubber. I have discovered that among the lower paraffins and olefins the rate of diffusion through a thin rubber wall increases with molecular weight and the diffusion rate for a given olefin is more rapid than for a paraffin of the same boiling point. I have determined the relative rate at which a number of gaseous paraffins and olefins passed through a toy balloon rubber from a pressure of one atmosphere at the inlet face to the outlet face bathed in atmospheric air. The relative rates of diffusion are roughly as follows:

| | |
|---|---|
| Propane | 1.0 |
| Propylene | 1.5 |
| Butane | 9.0 |
| Butene-2 | 22.0 |
| Isobutylene | 7.0 |
| Isobutane | 2.0 |

This difference in diffusion rate is probably due to the difference in solubility of the hydrocarbons in the rubber rather than through simple diffusion through pores.

Practical embodiments are suggested as follows:

A rubber membrane is stretched on a supporting wall which must be of perforated construction or the equivalent. The gas to be diffused is passed under turbulent flow in contact with the rubber. The diffusate passes out from that face of the rubber in contact with the supporting wall and on this side, the exit side, a provision for turbulence adjacent to the rubber face is not necessary. The diffusate is delivered under its own pressure, such as atmospheric pressure, from the exit face of the rubber, if a pressure sufficiently high is maintained on the other side to give a partial pressure of diffusate at least as great as the pressure to be delivered. This type of construction permits large pressure differences to be maintained without danger of rupturing the rubber. Alternatively, a support for the membrane of less mechanical strength may be used if a diluent gas of relatively insoluble character with respect to rubber be passed along the exit face of the diffusion septum. To effect a high degree of concentration a plurality of consecutive stages may be used, the diffusate from one stage serving as the raw material for the next stage and so on. The gas or vapors leaving any stage except the last may be returned to the inlet vapors entering a preceding stage of similar content of desired diffusate and in this way a high yield of diffusate together with high efficiency of separation may be obtained. Pumps or centrifugal blowers may be used to effect the necessary elevation in pressure for returning such intermediate fractions to earlier diffusion stages in the sequence. Obviously, telescoped cylindrical tubes concentrically arranged or an echelon of flat disc-like diffusion septa or other forms may be used to obtain substantially equivalent effect.

It is usually best to pass the gases or vapors continuously over the diffusion membrane and in a state of active turbulence. Elevated temperatures, sufficiently high to maintain the gaseous state, may be used to permit the treatment of mixtures having a dew point higher than room temperature.

With reference now to the attached drawing, it will be appreciated in what manner one embodiment of the present invention is practiced.

Figure 2:
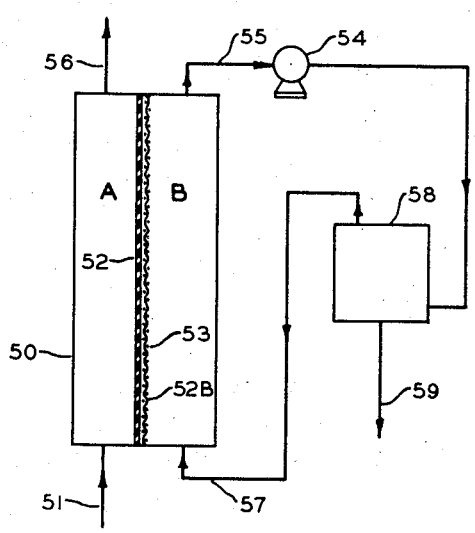

Figure 1 diagrammatically illustrates one form of apparatus for practicing the present invention, and, Figure 2 diagrammatically illustrates an apparatus for practicing a modified form of the invention.

A charge of the hydrocarbon gas to be diffused is drawn through conduit 10 by the pump 11 and forced into conduit 12 and thereby introduced into a diffusion chamber 13.

There may be a plurality of diffusion chambers such as the one 13, and in this present description there are illustrated the additional diffusion chambers 14 and 15 which are arranged in series.

The several diffusion chambers 13, 14 and 15 are each internally divided into portions or zones A and B by longitudinally disposed division members, or septa, 16, 17 and 18, respectively, which are in the form of thin, rubber membranes, and which are stretched and supported upon suitable members such as the wire supports 19, 20, and 21.

The hydrocarbon mixture of gas from which the concentrate or desired hydrocarbons are to be removed is initially introduced into the zone A of the diffusion chamber 13 and therein, under pressure of the pump 11, and of pump 26 as will presently be explained, it comes in contact with the rubber membrane 16, and a part of the hydrocarbon mixture or gas charge, is diffused through the membrane into the zone B, or exit side, of the chamber 13.

That part of the original gas charge, or the part not capable of penetrating the membrane 16 will leave the chamber 13 and the zone A thereof through the discharge conduit 22.

From the exit side of chamber 13, or the zone B thereof, the diffusate is drawn through a conduit 23 by the pump 24 and forced under pressure into the inlet side, or zone A, of the chamber 14 wherein the pressure upon the gas will force a portion of it through the membrane 17 and into the outlet side, or zone B of the chamber. In portion A of the chamber 14 all gas not penetrating the membrane 17 is withdrawn through the conduit 25 and forced by the pump 26 into the conduit 12 to be recharged into the zone A, or inlet side, of the first chamber 13.

Thus it will be appreciated that the diffusate from the first stage of the process, or from the zone B of the chamber 13 serves as the charging gas, or raw stock, for the second stage of the process effected in chamber 14. In this manner the mixture of hydrocarbon gas constituting the charge which is fed to zone A of chamber 13 is under pressure by virtue of the function of pumps 11 and 26, and a greater pressure therefore exists in zone A than in zone B of the chamber 13 because of pump 24 which withdraws the diffusate from zone B by way of conduit 23. By this manner of maintaining a higher pressure in zone A than in zone B of the chamber 13, and in the zones A and B of all subsequent diffusion chambers to be described, namely, chambers 14 and 15, the concentrates of desired hydrocarbons are readily collected from the mixture of hydrocarbon gases as the concentrates are positively forced, and/or drawn through membranes.

From the outlet side of chamber 14 or the zone B thereof, the diffusate is withdrawn through the conduit 27 by the pump 28 and forced under pressure into the inlet side, or zone A, of chamber 15 wherein the gas contacts the membrane 18 and a portion thereof passes therethrough into the zone B, from whence it is withdrawn through conduit 29 as the product. Pump 30 may be interposed in conduit 29 to facilitate the withdrawal of the product from the zone B, and assist in maintaining it at a lower pressure than zone A. All gas in zone A of chamber 15 which does not penetrate the membrane 18 is withdrawn therefrom by the pump 31 through the conduit 32 and forced into conduit 23 which leads into zone A of chamber 14 wherein they are reprocessed.

It is to be appreciated that while the utilization of the various pumps as described will greatly expedite the practice of this invention in so much as they maintain a higher pressure in zone A than in zone B of the several diffusion chambers and thereby speed the diffusion of the concentrate of the desired hydrocarbons through the membranes, the invention could be practiced equally as effective if pumps were utilized only to maintain high pressures in zones A of the several diffusion chambers, or if pumps were employed only to maintain reduced pressures in the zones B of the several diffusion chambers.

With reference now to Figure 2 of the drawing a modified form of the present invention will be described. The hydrocarbon mixture enters a diffusion chamber 50 by way of conduit 51 and therein contacts in zone A the rubber membrane or septum 52 mounted upon the support 53, and the concentrate of desired hydrocarbons which are soluble in the rubber membrane pass therethrough into zone B. The passage of the concentrate of desired hydrocarbons from zone A to zone B is assisted by the pump 54 interposed in conduit 55, the full function of which will be presently described.

In zone A of the diffusion chamber 50 all of the hydrocarbon mixture not soluble in the membrane 52 and which therefore does not pass through it, is exhausted by way of conduit 56.

From zone B of the diffusion chamber 50 the concentrate of desired hydrocarbons which diffuse through the membrane 52 are withdrawn by pump 54 through the conduit 55, and to assist in the withdrawal of the concentrate of desired hydrocarbons from zone B, and from the face of the membrane 52 adjacent the zone B, a stream of carrier gas such as hydrozen, methane, or air, which is insoluble in the membrane 52, and therefore incapable of penetrating therethrough, is introduced into zone B of the chamber 50 by way of the conduit 57 and as it flows through zone B it will sweep away from the wall 52B of the membrane 52, the concentrate of desired hydrocarbons and together therewith will be withdrawn from zone B by virtue of pump 54 through the conduit 55 and introduced into any type of suitable separator 58 such as an oil scrubber, or low temperature condenser, wherein the carrier gas is separated from the concentrate of desired hydrocarbons and withdrawn through conduit 57 for continuous recycling through the zone B of the diffusion chamber 50. The concentrate of desired hydrocarbons, after effecting a separation thereof from the carrier gas, is withdrawn from the separator 58 by way of conduit 59.

It is to be understood that while the modified practice of this invention has been described as a single unit or step of the present method, it too is contemplated to be used under desirable circumstances in a series of steps as taught in connection with the description of the apparatus for practicing the invention disclosed in Figure 1; in which case there would be a plurality of diffusion chambers similar to the one marked 50, which would be arranged in series and each provided with a suitable separator, and the hydrocarbons in zone A of the diffusion chambers which did not diffuse through the membrane would be returned to zone A of the preceding diffusion chamber as taught in connection with the description of Figure 1.

The relative rates of passage of pure hydrocarbons through a thin sheet of rubber separating two gas chambers were found to be as shown in Table I. The rubber sheet was supported against a fine mesh wire screen. In one series of experiments, the absolute pressure of the hydrocarbon was 75 cm. of mercury and in another series it was 115 cm. The gas diffusing through the rubber was removed by means of a vacuum pump which maintained an absolute pressure of 8–10 mm. of mercury on exit side of the rubber sheet.

TABLE I

*Relative diffusion rates of pure hydrocarbons through rubber*

(Propane=1)

| | At pressure of 75 cm. mercury | At pressure of 115 cm. mercury |
|---|---|---|
| Propane | 1.0 | 1.0 |
| Isobutane | 0.96 | 1.38 |
| Isobutylene | 1.87 | 3.61 |
| Butene-1 | 2.48 | 4.51 |
| n-Butane | 2.54 | 5.55 |
| Butene-2 | 5.50 | 10.46 |

An application of the present invention to the concentration of olefin hydrocarbons, particularly the normal olefins, is illustrated by the following example. Mixtures of four carbon atom hydrocarbons obtained by fractionating cracking still vapors were placed in contact with the rubber sheet as described in the foregoing experiments.

The diffusate was pumped off, collected and analyzed with the following results:

TABLE II

*Concentration of olefins by diffusion through rubber*

| | Composition of original mixture per cent by volume | Composition of diffusate per cent by volume | |
|---|---|---|---|
| | | 75 cm. mercury | 115 cm. mercury |
| Isobutene | 23.0 | 20.9 | 22.9 |
| Normal butenes | 35.5 | 47.4 | 43.4 |
| Butanes | 41.5 | 31.8 | 33.7 |
| Isobutene | 1.2 | 2.0 | 1.2 |
| Normal butenes | 18.5 | 27.5 | 26.8 |
| Butanes | 80.3 | 70.5 | 72.0 |

These data show a very marked increase in the concentration of the normal butene. They also indicate that the selectivity is lowered somewhat by increasing the total pressure of the gas on the high pressure side of the membrane in order to increase the rate of diffusion. It is obvious from these data that concentrates containing much higher percentages of normal butanes can be obtained by the use of several similar diffusion stages applied consecutively.

Differences in the ingredients compounded with the rubber or in the completeness of curing will affect the specificity for the various hydrocarbons but the most favorable material can be selected by means of simple diffusion tests. Materials other than rubber exerting at least a little solvent action on hydrocarbons may likewise be mechanically supported and used for the purpose, such as chloroprene rubber, styrene polymer, lacquer films and the like.

By this invention there may be produced from a rough fraction of butanes and butylenes obtained by fractional distillation of cracking still vapors, a concentrate containing a predominance of the 2-butenes. I can also effect a concentration of high molecular weight paraffin or olefin hydrocarbons from a mixture containing a number of homologues. The simpler alicyclic and aromatic hydrocarbons diffuse readily as do the olefins, and a concentrate high in aromaticity or octane number can be obtained by this method.

In some cases liquid hydrocarbons such as gasoline can be separated into fractions differing in characteristics by this means. Other gases, notably hydrogen sulfide and carbon dioxide, can be removed from a gas stream and concentrated.

I claim:

1. The method of separating from a hydrocarbon mixture a fraction having a higher concentration of cyclic hydrocarbons, which comprises passing a stream of the said hydrocarbon mixture past one side of a rubber septum while maintaining a state of reduced pressure on the other side of said septum to draw the diffusate from said septum and remove the said concentrate of cyclic hydrocarbons therefrom.

2. The method of separating from a hydrocarbon mixture a fraction having a higher concentration of aromatic hydrocarbons, which comprises passing a stream of the said hydrocarbon mixture in contact with one side of a rubber septum while maintaining a lower partial pressure on the other side of said septum to draw a diffusate from said septum and to remove the same in the form of a concentration of aromatic hydrocarbons.

3. The method of separating from a hydrocarbon mixture a concentrate of desired hydrocarbons, comprising passing a turbulent stream of the hydrocarbon mixture in a gaseous state in contact with one side of a non-porous diaphragm of a material in which the desired hydrocarbons are more soluble than the other constituents of the mixture, whereby the said desired hydrocarbons dissolve in and diffuse through said diaphragm, and collecting the diffusate at the other side of the diaphragm by pumping off the escaping gases thereby maintaining a low partial pressure of the diffusate at the exit side of the said diaphragm.

4. The method of separating from a hydrocarbon mixture a concentrate of desired hydrocarbons, comprising passing a stream of the hydrocarbon mixture in contact with one side of a non-porous diaphragm of a material in which the desired hydrocarbons have a greater solubility than the other constituents of the mixture, whereby the said desired hydrocarbons dissolve in and diffuse through said diaphragm, passing a stream of gas relatively insoluble in the diaphragm in contact with the other side of the diaphragm to sweep away and maintain a decreased partial pressure of the diffusate, and recovering the diffusate from the gas.

5. The method of separating from a hydrocarbon mixture a concentrate of desired hydrocarbons, which comprises passing a stream of said hydrocarbons to a zone of elevated pressure, contacting said stream of hydrocarbons in said zone with one side of a non-porous membrane while maintaining a zone of reduced pressure on the other side of said membrane, causing desired hydrocarbons to dissolve in and diffuse through said membrane and to pass from said zone of elevated pressure to said zone of reduced pressure, withdrawing the diffusate from said zone of reduced pressure and passing it to a second zone of elevated pressure, contacting said diffusate in said second zone of elevated pressure with one side of a second non-porous membrane while maintaining a second zone of reduced pressure on the other side of said membrane, causing desired hydrocarbons to dissolve in and diffuse through said second membrane and to pass from said second zone of elevated pressure to said second zone of reduced pressure, withdrawing from said zone of reduced pressure a concentrate of said desired hydrocarbons, and withdrawing from said second zone of elevated pressure hydrocarbons not diffused through said second membrane and returning said hydrocarbons to said first mentioned zone of elevated pressure.

6. The method of preparing a concentrate of desired hydrocarbons from a complex gaseous hydrocarbon mixture, which comprises subjecting the said mixture to consecutive selective diffusion stages, each stage being accomplished in a chamber consisting of two portions separated by a supported non-porous membrane of a material in which the desired hydrocarbons are more soluble than other constituents of the mixture, whereby the said desired hydrocarbons dissolve in and diffuse through said membrane, elevating the pressure of the diffusate from one stage and passing it into the next stage, returning the undiffused residue gas leaving each stage, except the first, to the inlet gases entering a preceding stage of similar content of desired hydrocarbons, and collecting the diffusate from the final stage.

7. The method of preparing a butene-2 concentrate from a butene-butane mixture such as the four carbon atom fraction of cracking still gases, which comprises subjecting the said butene-butane mixture to repeated diffusion through non-porous rubber membranes.

8. The method of separating from a hydrocarbon mixture a concentrate of desired hydrocarbons, which comprises passing a liquid hydrocarbon mixture in contact with one side of a non-porous diaphragm of a material in which the desired hydrocarbons are more soluble than the other constituents of the said mixture, whereby the said desired hydrocarbons dissolve in and diffuse through said diaphragm, and collecting the diffusate at the other side of the said diaphragm in a zone maintained at a reduced pressure.

9. The method of separating from a hydrocarbon mixture a concentrate of desired hydrocarbons, which comprises passing a liquid hydrocarbon mixture in contact with one side of a non-porous diaphragm of a material in which the desired hydrocarbons are more soluble than the other constituents of the said mixture, and passing a stream of gas in contact with the other side of said diaphragm to withdraw therefrom and to collect a concentrate of the desired hydrocarbons dissolving in and diffusing through said diaphragm.

10. The method of producing concentrates of olefin hydrocarbons from gaseous mixtures containing olefin and paraffin hydrocarbons which comprises passing a gaseous mixture containing olefin and paraffin hydrocarbons in turbulent flow past one side of a rubber septum and removing the gases which pass from the opposite side of said rubber septum.

11. A process for separating hydrocarbons of higher molecular weight from hydrocarbons of lower molecular weight which comprises passing a gaseous mixture containing two or more hydrocarbons of different molecular weight in turbulent flow past one side of a rubber membrane and removing the gases containing hydrocarbons of higher molecular weight from the opposite side of said membrane.

12. The method of producing concentrates of unsaturated hydrocarbons from gaseous mixtures which comprises passing a gaseous mixture containing unsaturated hydrocarbons under a pressure in turbulent flow past one side of a rubber septum, maintaining the other side of said rubber septum under a lower pressure and recovering the unsaturated hydrocarbons which pass from the other side of said rubber septum.

13. A method of separating isomeric olefins from hydrocarbon mixtures which comprises passing a hydrocarbon mixture containing at least two olefins of the same molecular weight and of different molecular structure in turbulent flow past one side of a rubber membrane, and removing gases containing one of said olefins in a more concentrated state from the opposite side of said membrane.

14. A method of separating isobutene from butene-2 which comprises passing a hydrocarbon mixture containing butene-2 and isobutene past one side of a rubber membrane, whereby butene-2 dissolves in and passes through said rubber membrane more readily than isobutene, and removing gases containing butene-2 in a more concentrated state from the opposite side of said membrane.

FREDERICK E. FREY.